Aug. 17, 1926.
H. S. JANDUS
1,596,491
AUTOMOBILE BUMPER
Filed Nov. 12, 1923
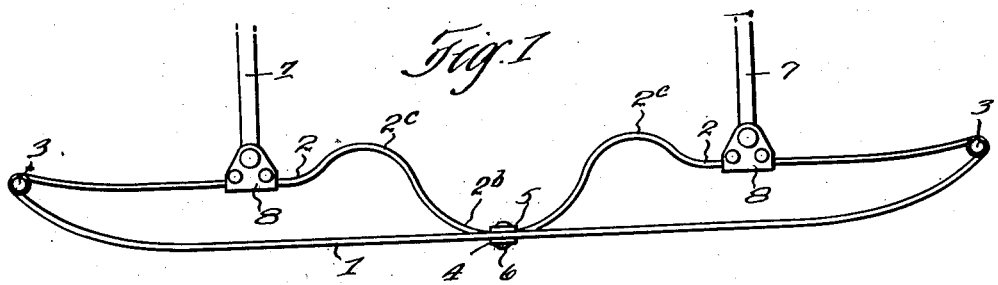
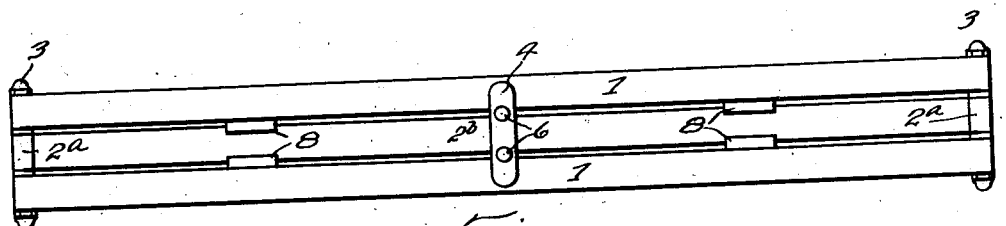
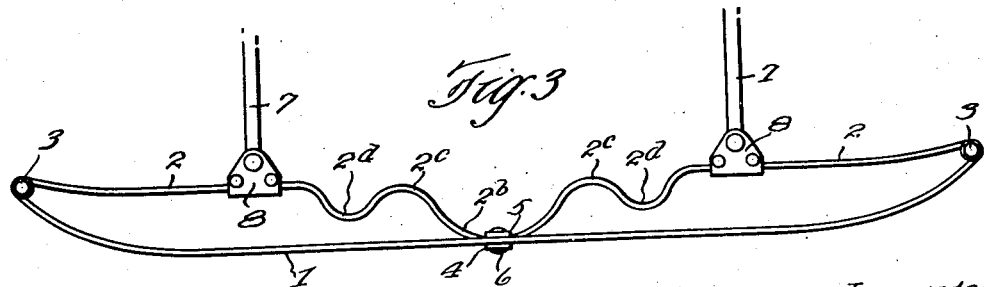
Inventor
Herbert S. Jandus,
By Hull, Brock West,
Attys.

Patented Aug. 17, 1926.

1,596,491

UNITED STATES PATENT OFFICE.

HERBERT S. JANDUS, OF DETROIT, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed November 12, 1923. Serial No. 674,165.

This invention relates to bumpers for automobiles and similar vehicles, and has for its general object to provide a construction of such bumpers and a manner of supporting the same which will relieve the lateral stress imposed upon the supports when a severe blow is received by the bumper intermediate of such supports.

A further object of the invention is to provide a bumper, having the characteristics referred to, which is also capable of standing, with marked efficiency, the ordinary incidents of use.

In the drawing, forming part hereof, Fig. 1 represents a plan view of a bumper embodying my invention, together with the supporting arms therefor; Fig. 2, a front elevation of such bumper; and Fig. 3, a plan view of a modification of the bumper shown in the preceding views.

In both forms of my invention shown herein, the bumper is provided with a rear bar to which the supporting arms are connected, and the rear bar is so formed as to provide, between the supporting arms, an amount of metal additional to that required for supporting and bracing or trussing purposes, which surplus stock will yield under impact and thus relieve the supporting arms of a considerable amount of lateral strain that would otherwise be imposed thereupon by the blows imparted to the front or impact portion of the bumper intermediate of such arms.

In the drawings, my invention is shown as applied to a bumper of the character shown in McGregor Patent No. 1,372,154, issued March 22, 1921, said bumper comprising a pair of vertically spaced, parallel front or impact bars 1, each having an eye at each end thereof, and a rear bar 2 having an eye at each end thereof, as indicated at 2ª, the eyes on the ends of the last-mentioned bar being interposed between and aligned with the eyes on the ends of the vertically spaced bars 1 and being connected thereto by the bolts 3.

As is the case with the bumper shown in the McGregor patent referred to, the central portion 2ᵇ of the bar 2 is projected toward and between the central portions of the bars 1 and is connected thereto by a pair of clamping plates 4, 5, connected by bolts or rivets 6.

The bumper is supported from the side members of the vehicle (not shown) by means of a pair of arms 7 and clamps 8 pivotally mounted on the ends of said arms and connected to the rear bar 2 between the central portion of the bar and such ends thereof.

Where the portion of the rear bar between the arms 7 and clamps 8 is connected to the central portions of the bars 1 without any surplus metal being provided, a blow delivered to the bars 1, between the supporting arms 7, will deflect the central portion of such bars rearwardly and, as soon as the centrally deflected portion of the rear bar is moved rearwardly a comparatively short distance, a lateral strain will be brought upon the arms 7 which will tend to bend them and also to spring the side members of the vehicle toward each other.

In order to minimize, and in many instances to eliminate, the injurious results following the action described, I have provided a surplus amount of metal in the portion of the bar 2 intermediate the arms 7, thereby effectively and materially increasing the length of the bar between these parts. This result may be accomplished in the manner shown in Fig. 1, wherein the rear bar is first bent rearwardly, adjacent to its support and intermediate of the two supports 7, and the central portion 2ᵇ is then projected inwardly from such rearwardly directed bends 2ᶜ.

In Fig. 3 of the drawing, the construction is identical with that shown in Figs. 1 and 2 except that the rear bar 2 is provided with a forwardly and rearwardly extending bend or corrugation on each side of the centrally deflected portion 2ᵇ, instead of with a single bend or corrugation, as is the case in Figs. 1 and 2. In Fig. 3, the bends or corrugations intermediate the central portion and of the supports 7 are indicated at 2ᵈ and 2ᵉ.

As the other parts of the bumper are identical with those shown in Figs. 1 and 2, they are identified by the same numerals as are employed upon such earlier views.

While I have shown my invention as embodied in a bumper having a plurality of front or impact bars, it will be evident that it is capable of being used with other types of bumpers, the particular form shown herein being the present preferred form in which I contemplate using my invention.

Having thus described my invention, what I claim is:—

1. The combination, with a pair of bumper supporting arms, of a bumper comprising a rear or auxiliary bar connected to said arms and a front or impact bar connected at its ends to the ends of the rear or auxiliary bar, the central part of the portion of the rear or auxiliary bar which is intermediate of such supporting arms being projected toward and connected to the central part of the impact bar and the part of the rear or auxiliary bar on each side of such central connection and between the said connection and the cooperating arm being bent or deflected at substantially right angles to the length of the bumper whereby a surplus length of material in such rear or auxiliary bar is provided between the supporting arms and the central portion of the bumper is capable of moving rearwardly for a material distance without lateral bending of the said arms.

2. The combination, with a pair of bumper supporting arms, of a bumper comprising a rear or auxiliary bar connected to said arms and a front or impact bar connected at its ends to the ends of the rear or auxiliary bar, the central part of the portion of the rear or auxiliary bar which is intermediate of such supporting arms being projected toward and connected to the central part of the impact bar and the part of the rear or auxiliary bar on each side of such central connection and between the said connection and the cooperating arm being provided with alternating forwardly and rearwardly projecting bends whereby a surplus length of material in such rear or auxiliary bar is provided between the supporting arms.

3. The combination, with a pair of supporting arms, of a bumper comprising a rear or auxiliary bar connected to said arms and one or more impact bars connected to the ends of the rear or auxiliary bar, the central portion of the first-mentioned bar being projected toward and secured to the central portion of the front bar or bars, the portions of the rear bar between such centrally connected portion and the supporting arms being formed into one or more bends extending at substantially right angles to the length of the bumper thereby to increase the effective length of the deflected portions of the rear bar included between the said arms and whereby the central portion of the bumper is capable of moving rearwardly for a material distance without lateral bending of the said arms.

In testimony whereof, I hereunto affix my signature.

HERBERT S. JANDUS.